(12) United States Patent
Jang

(10) Patent No.: US 6,500,046 B2
(45) Date of Patent: Dec. 31, 2002

(54) ROYAL JELLY COLLECTION FRAME

(76) Inventor: Bong Hwan Jang, 3-8, Shichon-dong, Seo-gu, Inchon (KR), 404-150

( * ) Notice: Subject to any disclaimer, the term of this patent is extended or adjusted under 35 U.S.C. 154(b) by 0 days.

(21) Appl. No.: 10/088,210
(22) PCT Filed: Jul. 16, 2001
(86) PCT No.: PCT/KR01/01217
§ 371 (c)(1), (2), (4) Date: Mar. 15, 2002
(87) PCT Pub. No.: WO02/05632
PCT Pub. Date: Jan. 24, 2002

(65) Prior Publication Data
US 2002/0137429 A1 Sep. 26, 2002

(51) Int. Cl.[7] ................................................ A01K 47/06
(52) U.S. Cl. ............................................ 449/3; 449/44
(58) Field of Search ................................ 449/2, 10, 18, 449/21, 35, 42, 43, 44, 3

(56) References Cited

U.S. PATENT DOCUMENTS

| | | | | |
|---|---|---|---|---|
| 92,348 A | * | 7/1869 | Paddock et al. | 449/42 |
| 2,723,402 A | * | 11/1955 | France | 449/18 |
| 4,651,372 A | * | 3/1987 | Schmidt | 449/2 |
| 4,672,704 A | * | 6/1987 | Hong et al. | 449/3 |
| 5,830,039 A | * | 11/1998 | Fraser-Jones | 449/2 |

FOREIGN PATENT DOCUMENTS

FR       2582477 A1  * 12/1986  ................ 449/44

* cited by examiner

Primary Examiner—Robert P. Swiatek
(74) Attorney, Agent, or Firm—Bacon & Thomas, PLLC

(57) ABSTRACT

The invention relates to a royal jelly collection frame which enables to cultivate the queen bees easily and to collect royal jelly productively. According to the invention, there is provided with a royal jelly collection frame (10) comprizing of a queen excluder panel (2) having a plurality of holes through which the working bee can pass but the queen bee can not pass and a queen bee passage window (3) into which the queen bee can pass and it could be closed by cover, a queen cup insert panel (4) being spaced from the queen excluder panel (2) and having a plurality of hollow projections (21) into which the queen bee may spawn, an single queen cup member (5) having an closed end and being insertable into the outer wall of the hollow projections (21), and a bundle queen cup member (6) having a plurality of queen cup and being insertable into the corresponding hollow projections (21), and at least a queen cup mount (1) disposed at the other part of frame (10) and into which the bundle queen cup member can be mounted.

4 Claims, 5 Drawing Sheets

ROYAL JELLY COLLECTION FRAME

FIELD OF THE INVENTION

The present invention relates to a royal jelly collection frame, and more particularly to a royal jelly collection frame which enables to bring up the queen bees easily and to collect royal jelly productively.

BACKGROUND OF THE INVENTION

The success of bee keeping mainly depends upon how to acquire many superior queen bees, so the bee-keeper makes efforts to cultivate superior queen bees. In order to cultivate queen bees, the larvae of bee should be moved from the small working bee cells of honeycomb to the relatively big artificial queen cups in which the larvae will grow into queen bees or the working bee will secrete royal jelly. To do this, the bee keeper should cautiously pick up the individual larva by needle or pincette manually to move it without causing no damage on larva. And it will be impossible for the weak-sighted bee keeper to move the larvae from working bee cells to queen cups without causing the wounds on larvae. Therefore, the job of moving the larvae is very difficult and troublesome, so requires many times and labors.

On the other hand, in order to collect the royal jelly, it is also necessary to transfer many larvae from working bee cells into queen cups, which will also cause many labors and times. Therefore, it is desired to provide a solution to move the larvae from working bee cells to queen cups effectively for cultivating the queen bee or for collecting royal jelly.

SUMMARY OF THE INVENTION

The present invention was created to resolve the above problem in relation with bee larvae moving for cultivation of queen bee or collection of royal jelly, and the object of the invention is to provide a royal jelly collection frame by which the bee keeper can easily move the bee larvae from working bee cells to queen cups in which the larvae will grow into queen bees or the working bee will secrete royal jelly.

According to one aspect of the invention, there is provided with a royal jelly collection frame 10 comprizing of a queen excluder panel 2 having a plurality of holes through which the working bee can pass but the queen bee can not pass and a queen bee passage window 3 into which the queen bee can pass and it could be closed by cover, a queen cup insert panel 4 being spaced from the queen excluder panel 2 and having a plurality of hollow projections 21 into which the queen bee may spawn, an single queen cup member 5 having an closed end and being insertable into the outer wall of the hollow projections 21, and a bundle queen cup member 6 having a plurality of queen cup and being insertable into the corresponding hollow projections 21, and at least a queen cup mount 1 disposed at the other part of frame 10 and onto which the bundle queen cup member 6 can be mounted.

According to other aspect of the invention, there is provided with a royal jelly collection frame 10 being further provided with a feeder chamber 30 on the upper part of it, the feeder chamber 30 having a floating chamber 34 with float 34 and feed inlet 35 to feed the bee during no honey season.

According to another aspect of the invention, there is provided with a royal jelly collection frame 10, in which a cup cover 40 is further provided with to be inserted into the opening end of the queen cup 5, 6 the cup cover 40 having a opening 42 smaller than the opening 41 of the queen cup 5, 6.

DETAILED DESCRIPTION OF THE INVENTION

Figure 1:
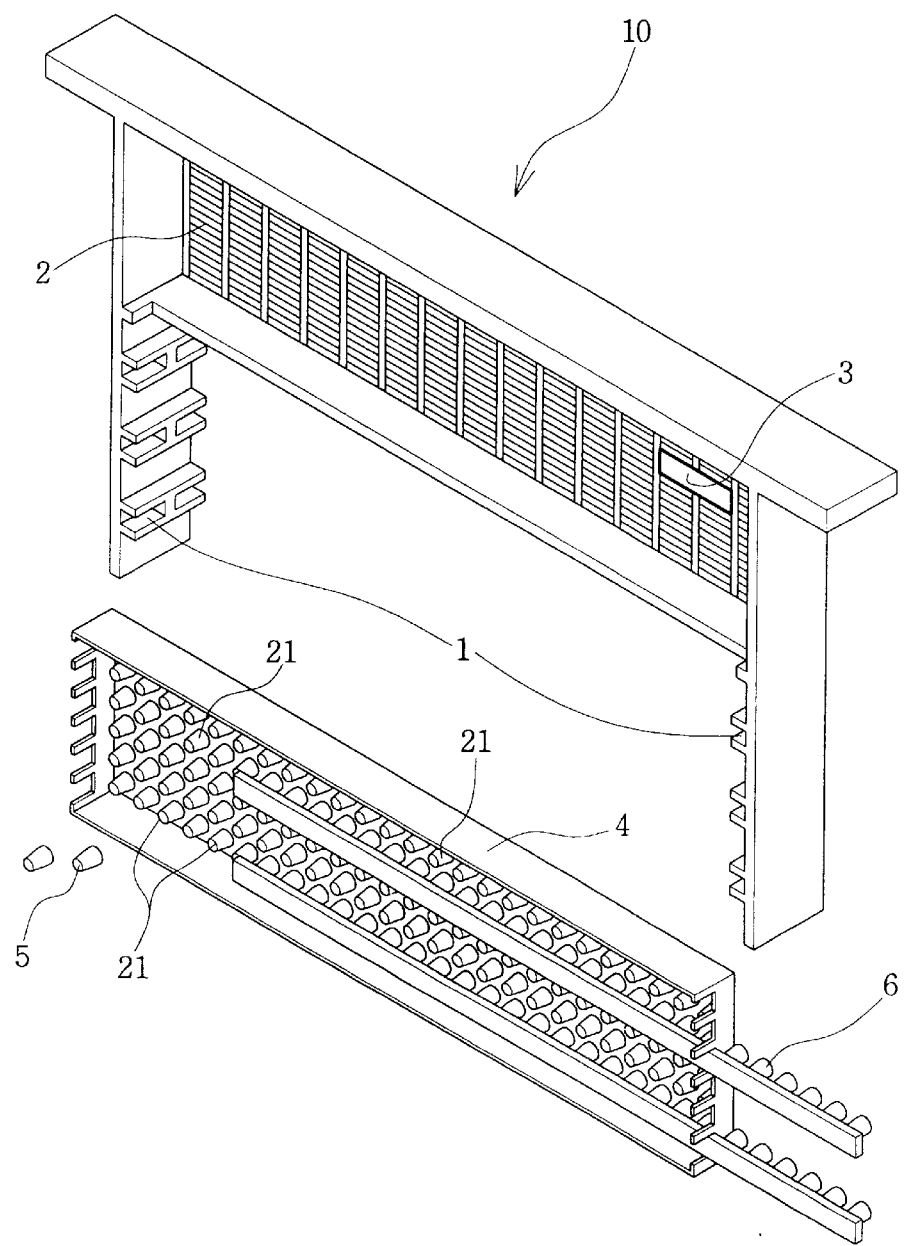
FIG. 1 shows the exploded view of an embodiment of the invention
Figure 2:
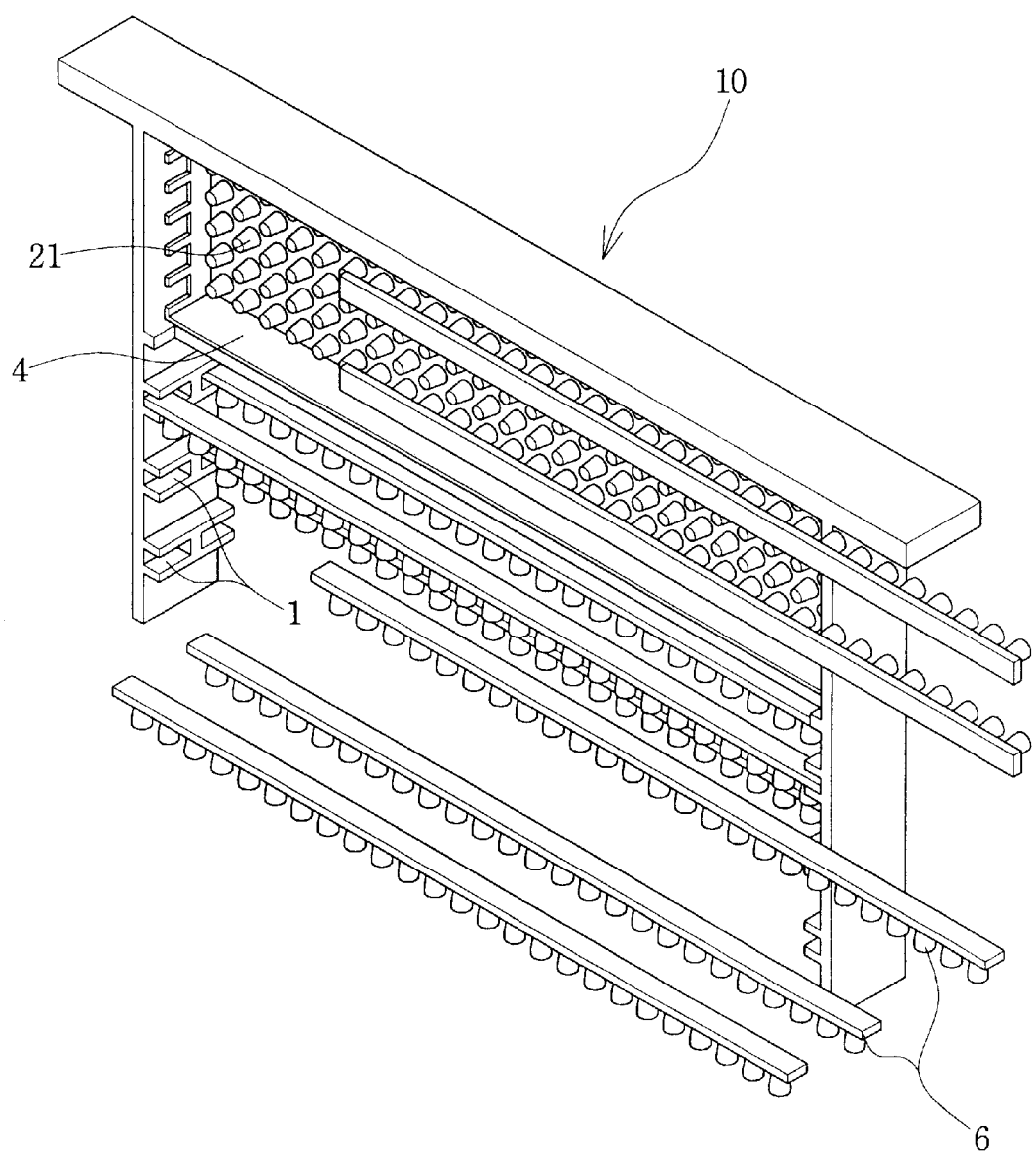
FIG. 2 shows the view of the above embodiment in use

In the following, preferred embodiments of the invention are described by referring to the accompanying drawings. FIGS. 1 and 2 shows one embodiment of royal jelly collection frame 10 which is provided with an queen excluder panel 2 having a plurality of holes of the size such that the working bee can pass through but the queen bee can not pass. But the queen excluder panel 2 has a queen bee passage window 3 into which the queen bee can pass and it can be closed by cover. The queen bee can be separated from working bees by having the queen bee pass through the window 3 of queen bee excluder panel 1 and then closing it.

There is provided a queen cup insert panel 4 being spaced apart with the queen excluder panel 2. The queen cup insert panel 4 has a plurality of hollow projections 21. The hollow projection 21 has the shape of a short pipe with both ends open. The inner space of the hollow projection 21 functions as the spawning nest or cell into which the queen bee may lay eggs.

There is provided a single queen cup member 5 with a short pipe shape that has one opened end and the other closed end. There is also provided with a bundle queen cup member 6 having a plurality of the single type queen cup 5. The shown embodiment of the bundle queen cup member 6 is a line type or bar type queen cup on which the queen cups are disposed along the bar. But other array patterns of queen cup may be possible if it could meet the object of the invention.

The queen cup 5, 6 has the size such that the open end of the queen cup 5, 6 can be fitted into the outer wall of the hollow projection 21 of queen cup insert panel 4. And a queen cup mount 1 is provided on inner side of the frame 10 on which the detached queen cup 6 may be mounted.

In order to cultivate the queen bee, the single type queen cup 5 should be fitted into the hollow projection 21 of queen cup insert panel 4. Then the queen bee will access into the hollow projection 21 front the side of open end and it may spawn in the single queen cup member 5. Then, the queen cup 5 is detached from the queen cup insert panel 4 and moved to other bee hive in which queen bee is cultivated. Therefore, it is not necessary to pick up the larvae with needle or pincette elaborately, so the job of moving the larva could be done with ease.

In order to collect the royal jelly, the bundle queen cup member 6 should be fitted into the hollow projection 21 of queen cup insert panel 4. After the queen spawns in it, it will be detached from queen cup insert panel 4 and it should be mounted on the adjacent queen cup mount 1 inside the frame 10. Therefore, there will be no need for further royal jelly collection frame to collect royal jelly because it will be completed within one frame 10.

Figure 3:
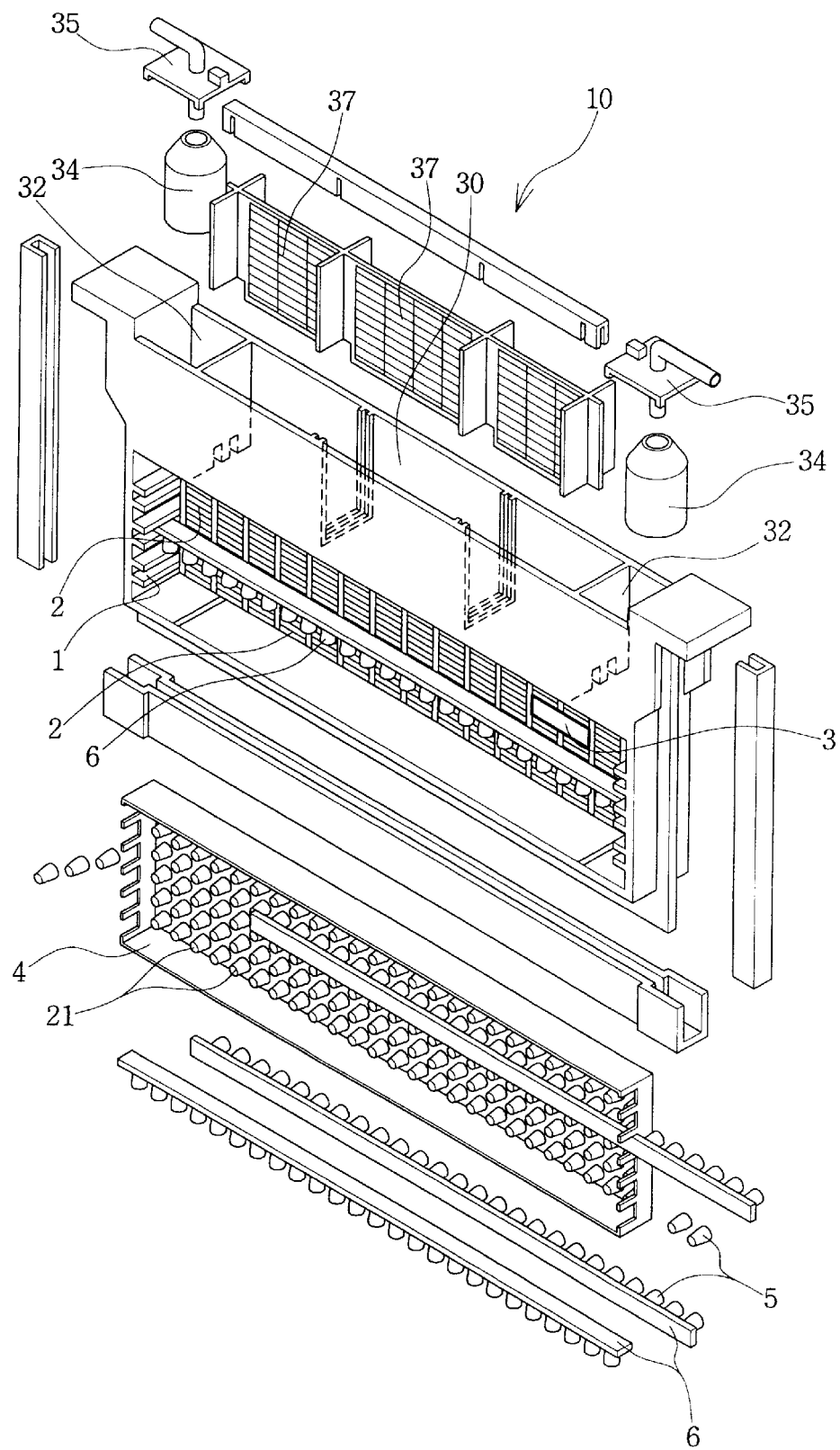
FIGS. 3 and 4 show the views of another embodiment of the invention
Figure 4:
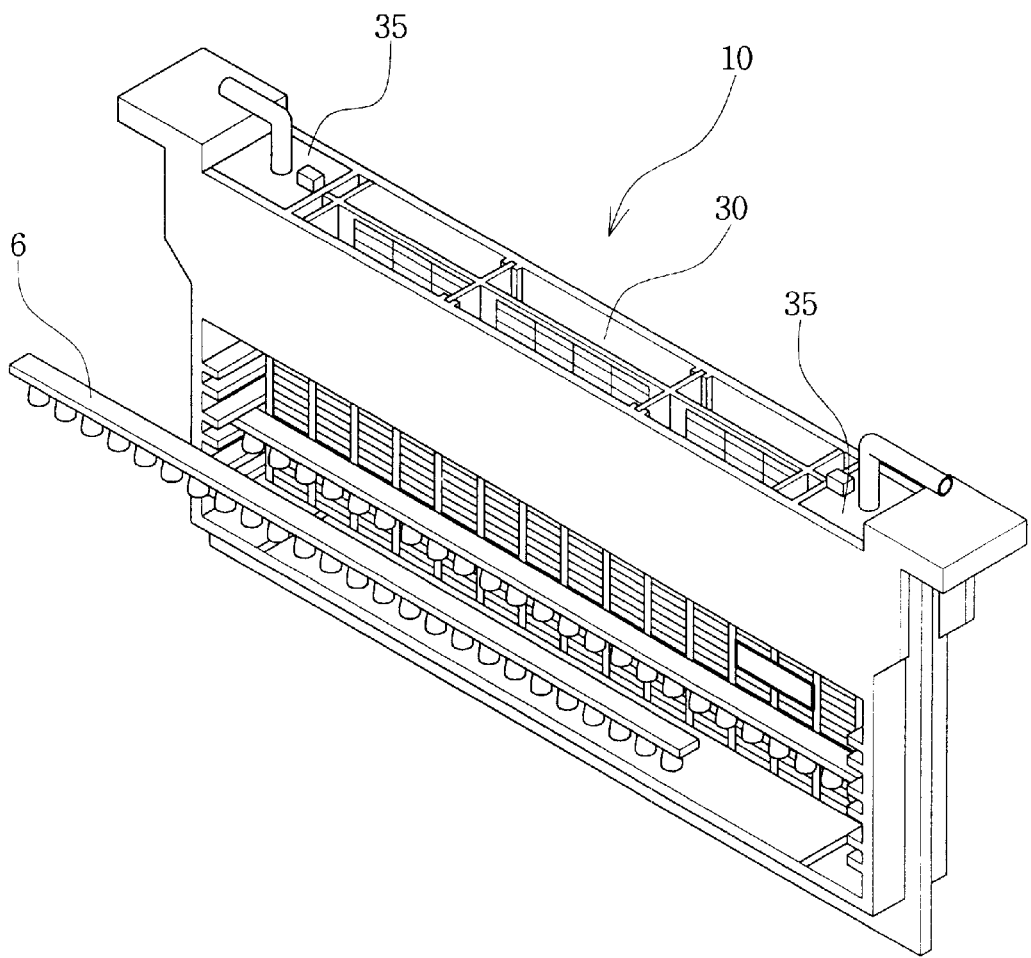

FIGS. 3 and 4 show another embodiment of the invention, in that the queen excluder panel 3 and queen cup insert panel 4 disposed on the lower part of the frame 10, and the feeder chamber 30 is disposed on the upper part of the frame 10. The feeder chamber 30 has a floating chamber in which the float 34 and feed inlet 35 are provided in order to feed the bee during no honey season. The numeral 37 is a supporter on which bee can suck the feed such as sugar water.

Figure 5:
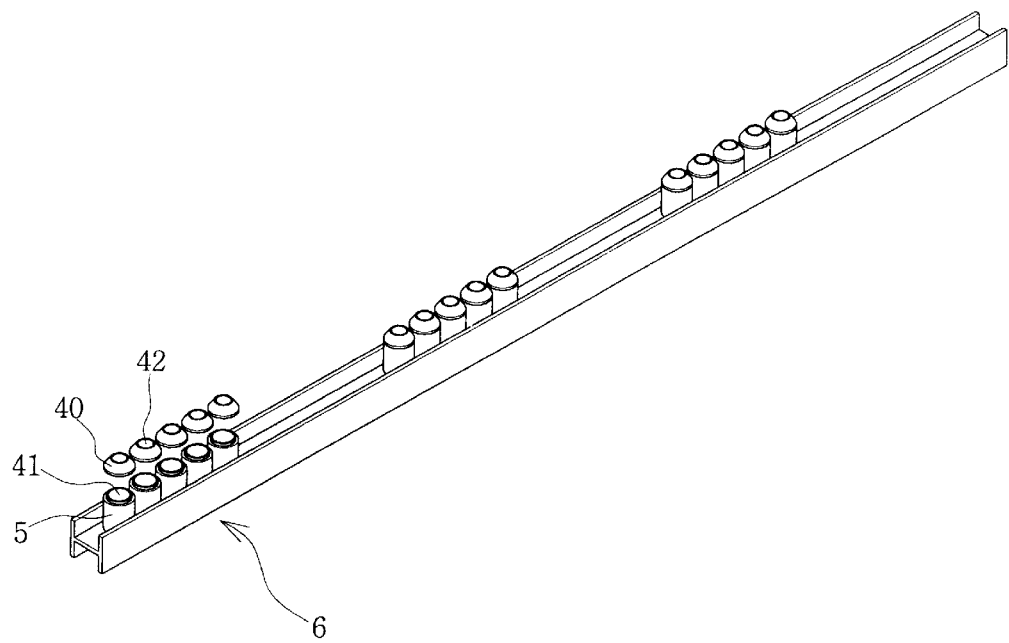
FIG. 5 shows the cup cover of the invention

FIG. 5 shows the queen cup 6 which has a cup cover 40. The cup cover 40 has a opening 42 with a smaller size than the opening 41 of the queen cup 6. If the cup cover 40 is inserted on the opening 41 of the queen cup 6, then the working bee would save the effort to apply or cover the wax around the opening 41 of queen cup 6. Therefore, the working bee can devote more to make the royal jelly to achieve increased production of royal jelly. And there will be no need to remove the wax covered around the opening of queen cup in order to detach the royal jelly form queen cup for royal jelly collection, because it will be done only by detaching the cup cover 40 from the queen cup 6.

What is claimed is:

1. A royal jelly collection frame 10 comprising a queen excluder panel 2 having a plurality of holes through which a working bee can pass but a queen bee can not pass and a queen bee passage window 3 into which a queen bee can pass, a queen cup insert panel 4 being spaced from the queen excluder panel 2 and having a plurality of hollow projections 21 into which a queen bee may spawn, an individual queen cup member 5 having a closed end and being insertable into the outer wall of the hollow projections 21, and a multiple queen cup member 6 having a plurality of queen cups and being insertable onto the corresponding hollow projections 21, and at least a queen cup mount 1 disposed on a part of frame 10 and onto which the multiple queen cup member 6 is mountable.

2. A royal jelly collection frame of claim 1, including a feeder chamber 30 on an upper part of the frame, the feeder chamber 30 having a floating chamber 34 with float 34 and feed inlet 35, and arranged to feed bees during no honey season.

3. A royal jelly collection frame of claim 2 including a cup cover 40 arranged to be insertable into an open end of the queen cup 5, 6 the cup cover 40 having an opening 42 smaller than the opening 41 of the queen cup 5, 6.

4. A royal jelly collection frame of claim 1 including a cup cover 40 arranged to be insertable into an open end of the queen cup 5, 6 the cup cover 40 having an opening 42 smaller than the opening 41 of the queen cup 5, 6.

* * * * *